Sept. 24, 1935.   G. M. EVANS   2,015,515
REFRIGERATING APPARATUS
Filed Oct. 26, 1933
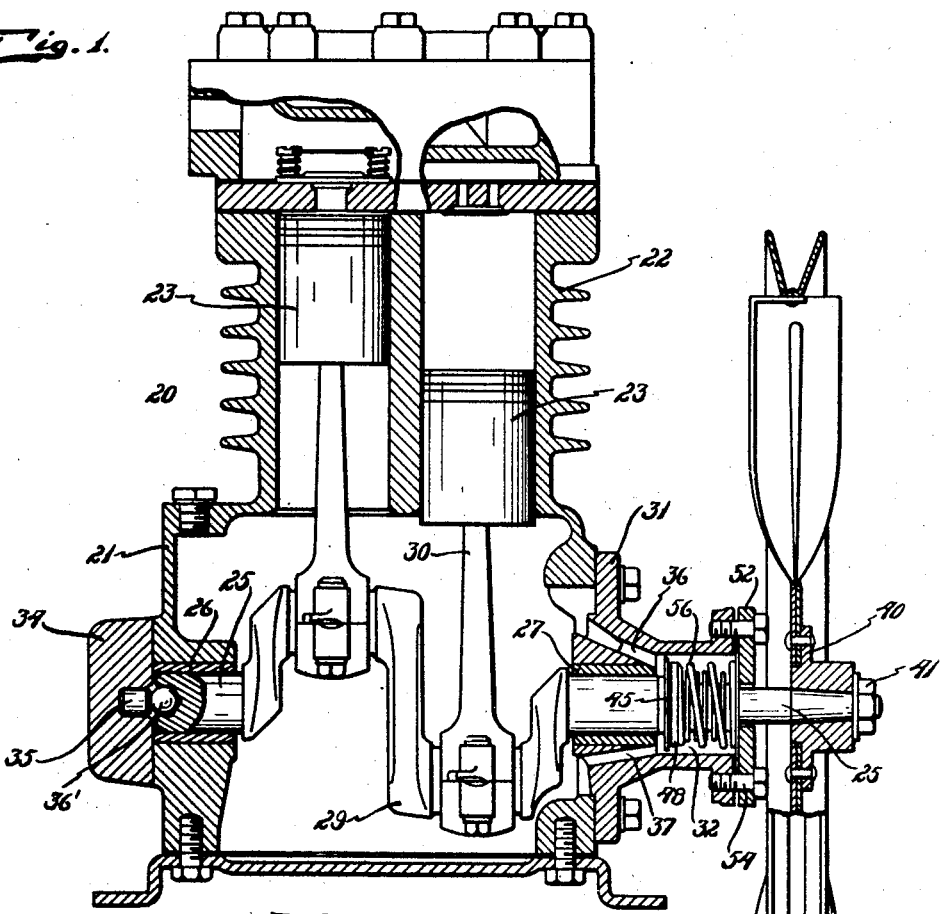
INVENTOR.
GORDON M. EVANS
BY
Warren H. F. Dehmsdrey
ATTORNEY.

Patented Sept. 24, 1935

2,015,515

UNITED STATES PATENT OFFICE 2,015,515

REFRIGERATING APPARATUS

Gordon M. Evans, Detroit, Mich., assignor to Kelvinator Corporation, Detroit, Mich., a corporation of Michigan Application October 26, 1933, Serial No. 695,233

1 Claim. (Cl. 286—11)

The present invention relates to shaft seals for compressors or the like.

In that type of compressor or the like in which the driving shaft extends through an opening in a wall of the compressor for the purpose of connecting the extended end with a driving element, it is necessary to provide a hermetic seal or connection between the driving shaft and the casing in order to prevent the ingress or egress of fluid to or from the compressor. In certain types of compressors this hermetic connection is provided by providing a slidable frictional ground surface connection between rotating and nonrotating parts. One of the objects of the present invention is to provide an improved shaft seal including a thrust member, for one of the elements of this connection, which thrust member provides a plurality of points of contact with the said element.

Further objects and advantages will be apparent from the following description, reference being had to the accompanying drawing wherein a preferred form of embodiment of the present invention is clearly shown.

In the drawing:

Fig. 1 is a longitudinal sectional view of a compressor embodying the improved shaft seal;

Fig. 2 is a longitudinal sectional view of one side of the crank case and the shaft seal and Fig. 3 is a view of one of the thrust members.

Referring to the drawing there is shown a compressor 20 including a crank case 21 forming cylinders 22 in which are reciprocated pistons 23. A crank shaft 25 is journalled in bearings 26 and 27 disposed in opposite walls of the crank case 21. The crank arms 29 of the crank shaft 25 are connected to the piston by connecting rods 30. The crank case includes a removable cover plate 31 which carries the bearing 27 and this cover provides a housing 32. The opposite side of the crank case 21 is provided with a cover plate 34, in which is disposed a hardened bearing 35. As viewed in the drawing the left hand end of the crank shaft 25 forms a socket for a ball bearing 36' which is arranged to engage the hardened bearing 35. Ports 36 and 37 are formed in end cover 31 for conducting lubricant to and from the housing 32. The shaft 25 extends through the housing 32 and carries a driving wheel 40 which is held in place by a nut 41.

A shoulder 43 is formed on the shaft 25 and is ground to provide a sealing surface. This surface is in engagement with a sealing ring 44 which may be formed of a lubricant bearing material. Sealing ring 44 is carried by a thrust ring 45 and this thrust ring is provided with three sockets each retaining a ball bearing 46. A second thrust ring 48 of the conical bearing surface 49 is arranged to engage the balls 46. A longitudinally flexible diaphragm herein shown as an expansible metal bellows 50 is connected to the thrust ring 45 and the other end of the bellows is sealed to a disk 51. This disk is secured to the end of housing 32 by being clamped between a cover plate 52 and a sealing gasket 53 by bolts 54. A coil spring 56 surrounds the bellows 50 and is interposed between the disk 52 and the thrust ring 48 and normally urges said thrust ring against the balls 46 whereby to force the sealing ring 44 into sealing engagement with the ground surface shoulder 43 and hold the thrust bearing 36' in engagement with the hardened bearing 35. The hermetic connection of one end of the bellows 50 at the gasket 51 and the hermetic connection of the other end of the bellows, at the joint of ring 44 and surface 43 on shaft 25, prevent the escape of fluid from the crank case and prevent the ingress of fluid into the crankcase.

The three point ball bearing surface together with the conical surface 49 on the thrust ring 48 insures an even pressure of the sealing ring 44 on the ground surface 43 and in this manner, although there may be slight discrepancies in the manufacture of the components of this seal, even pressure is assured on the sealing surface between ring 44 and ground surface 43.

While the form of embodiment of the present invention as herein described constitutes a preferred form, it is to be understood that other forms might be adopted, all coming within the scope of the claim which follows.

I claim:

In a compressor, or the like, having a casing and a shaft passing through an opening in said casing, a sealing joint for sealing said opening, said sealing joint having a rotatable sealing surface, a non-rotatable element having a sealing surface, a flexible bellows sealed to casing and non-rotatable element, and means for yieldingly urging one of said sealing surfaces toward said other sealing surface, including at least three equal spaced bearings carried by said non-rotatable element, a thrust member bearing on said bearings and a single spring arranged so as to tend to force said thrust member into engagement with said bearings to urge said non-rotatable element toward said rotatable sealing surface.

GORDON M. EVANS.